United States Patent
Bryksa et al.

(10) Patent No.: US 9,161,219 B2
(45) Date of Patent: Oct. 13, 2015

(54) AUTHORIZING SECURED WIRELESS ACCESS AT HOTSPOT HAVING OPEN WIRELESS NETWORK AND SECURE WIRELESS NETWORK

(75) Inventors: Ellison W. Bryksa, Calgary (CA); Andrew T. MacMillan, Calgary (CA)

(73) Assignee: Guest Tek Interactive Entertainment Ltd., Calgary (CA)

( * ) Notice: Subject to any disclaimer, the term of this patent is extended or adjusted under 35 U.S.C. 154(b) by 565 days.

(21) Appl. No.: 13/530,541

(22) Filed: Jun. 22, 2012

(65) Prior Publication Data

US 2013/0347073 A1   Dec. 26, 2013

(51) Int. Cl.
*H04W 12/06* (2009.01)
*H04W 12/08* (2009.01)
*H04L 29/06* (2006.01)
*H04W 84/12* (2009.01)

(52) U.S. Cl.
CPC ............. *H04W 12/06* (2013.01); *H04L 63/083* (2013.01); *H04L 63/105* (2013.01); *H04W 12/08* (2013.01); *H04L 63/108* (2013.01); *H04L 63/168* (2013.01); *H04W 84/12* (2013.01)

(58) Field of Classification Search
CPC ...... H04W 12/06; H04W 12/08; H04L 63/08; H04L 63/083; H04L 63/0853; H04L 63/0876; H04L 63/10; H04L 63/105; H04L 63/108; H04L 63/168; H04L 2463/102
USPC ......... 726/4, 5, 7, 28; 713/168, 182; 380/270, 380/33; 709/229, 227, 225; 455/411, 410
See application file for complete search history.

(56) References Cited

U.S. PATENT DOCUMENTS

| | | | |
|---|---|---|---|
| 7,174,564 B1 * | 2/2007 | Weatherspoon et al. | 726/2 |
| 7,278,024 B2 * | 10/2007 | Sundararajan et al. | 713/183 |
| 7,437,145 B2 * | 10/2008 | Hamada | 455/410 |
| 7,490,348 B1 | 2/2009 | Harris | |
| 7,620,978 B1 * | 11/2009 | Reddy et al. | 726/4 |

(Continued)

OTHER PUBLICATIONS

Dennis Fisher, "IBM to Unveil Secure Open Wireless System at Black Hat", Aug. 3, 2011, downloaded from: https://threatpost.com/en_us/blogs/ibm-unveil-secure-open-wireless-system-black-hat-080311.

(Continued)

*Primary Examiner* — Zachary A Davis
(74) *Attorney, Agent, or Firm* — ATMAC Patent Services Ltd.; Andrew T. MacMillan

(57) ABSTRACT

A hotspot provides an open wireless network and a secure wireless network. The open wireless network has no network-level encryption and allows open association therewith. The secure wireless network employs network-level encryption and requires authentication of a received access credential from a client device before allowing association therewith. A system for authorizing the client device for secured access at the hotspot includes an access controller configured to establish an encrypted connection between the client device and a login portal of the hotspot over the open wireless network, and to store a user-specific access credential transmitted via the encrypted connection as a valid access credential in a credential database. The credential database is accessed by wireless access points of the hotspot to authenticate the received access credential from the client device in response to a request from the client device to associate with the secure wireless network.

16 Claims, 11 Drawing Sheets

(56) References Cited

U.S. PATENT DOCUMENTS

| | | | |
|---|---|---|---|
| 7,886,339 B2* | 2/2011 | Keohane et al. | 726/3 |
| 8,046,578 B1* | 10/2011 | Trudeau et al. | 713/154 |
| 8,255,681 B2 | 8/2012 | Molen et al. | |
| 8,312,286 B2 | 11/2012 | Harris | |
| 8,583,935 B2 | 11/2013 | Harris | |
| 8,619,735 B2* | 12/2013 | Montemurro et al. | 370/338 |
| 8,667,148 B1* | 3/2014 | Turner | 709/228 |
| 8,925,042 B2* | 12/2014 | Drovdahl et al. | 726/4 |
| 2004/0116115 A1 | 6/2004 | Ertel | |
| 2008/0089277 A1 | 4/2008 | Alexander et al. | |
| 2009/0046644 A1* | 2/2009 | Krishnaswamy et al. | 370/329 |
| 2011/0099598 A1 | 4/2011 | Shin et al. | |
| 2011/0296501 A1* | 12/2011 | Drovdahl et al. | 726/4 |
| 2012/0192258 A1* | 7/2012 | Spencer et al. | 726/7 |
| 2013/0269008 A1* | 10/2013 | Sheu et al. | 726/6 |
| 2013/0298209 A1* | 11/2013 | Targali et al. | 726/6 |

OTHER PUBLICATIONS

Karl Stetson, "Wi-Fi Certified™ Hotspot Program to Ease Subscriber Connectivity in Service Provider Wi-Fi® Hotspots", Mar. 22, 2011, downloaded from: http://www.wi-fi.org.

IEEE Computer Society, "IEEE Std 802.11n-2009", Oct. 29, 2009.

Office action dated Feb. 18, 2015 issued by the Canadian Intellectual Property Office for counterpart Canadian App. No. 2,817,932 (4 pages).

* cited by examiner

Exemplary credential database

| Username | Password | Expiry time | Client ID |
|---|---|---|---|
| amacmill | G34FFF | 2012/05/23 18:00 | 1 |
| rodm777 | R66YHF | 2012/05/23 19:10 | 2 |
| deertree | 4GHHJ90QQ | 2012/05/24 14:00 | 3 |
| woods | D3FGR3 | 2012/05/24 16:25 | 4 |
| dattner3 | F3FGH558N | 2012/05/24 17:00 | 5 |
| bryksa321 | H34f1A33 | 2012/05/24 18:00 | 6 |
| ⋮ | ⋮ | ⋮ | ⋮ |

FIG. 4

Exemplary outgoing firewall rules for controlling Internet access

| Client ID | Source VLAN | Target | MAC | Action |
|---|---|---|---|---|
| 1 | VLAN_secure | Internet | 44-B2-C1-02-C3-00 | Allow |
| 1 | VLAN_secure | Internet | 00-E4-A1-32-C3-39 | Allow |
| 2 | VLAN_secure | Internet | 20-B0-D0-86-BB-F9 | Allow |
| 3 | VLAN_secure | Internet | 71-FE-D0-26-A1-03 | Allow |
| 4 | VLAN_secure | Internet | 34-3A-A1-00-F3-31 | Allow |
| 5 | VLAN_secure | Internet | 26-BE-D1-46-AB-09 | Allow |
| 6 | VLAN_secure | Internet | 00-B0-D0-86-BB-F7 | Allow |
| * | * | Internet | * | Drop (redirect to login portal) |

FIG. 5

Exemplary outgoing firewall rules for controlling Internet access

| Source VLAN | Target | MAC | Action |
|---|---|---|---|
| VLAN_secure | Internet | * | Allow |
| VLAN_open | Internet | * | Drop (redirect to login portal) |

FIG. 8

Exemplary outgoing firewall rules for controlling Internet access

| Client ID | Source VLAN | Target | MAC | Action |
|---|---|---|---|---|
| 1 | VLAN_open | Internet | 44-B2-C1-02-C3-00 | Allow |
| 1 | VLAN_open | Internet | 00-E4-A1-32-C3-39 | Allow |
| 2 | VLAN_open | Internet | 20-B0-D0-86-BB-F9 | Allow |
| 3 | VLAN_open | Internet | 71-FE-D0-26-A1-03 | Allow |
| 4 | VLAN_open | Internet | 34-3A-A1-00-F3-31 | Allow |
| 5 | VLAN_open | Internet | 26-BE-D1-46-AB-09 | Allow |
| 6 | VLAN_open | Internet | 00-B0-D0-86-BB-F7 | Allow |
| N/A | VLAN_secure | Internet | * | Allow |
| N/A | VLAN_open | Internet | * | Drop (redirect to login portal) |

FIG. 9

AUTHORIZING SECURED WIRELESS ACCESS AT HOTSPOT HAVING OPEN WIRELESS NETWORK AND SECURE WIRELESS NETWORK

BACKGROUND OF THE INVENTION (1) Field of the Invention

The invention pertains generally to wireless hotspots. More specifically, the invention relates to authorizing a wireless client device for secured wireless access at a hotspot having both an open wireless network and a secure wireless network.

(2) Description of the Related Art

Hospitality establishments such as hotels, resorts, coffee shops, shopping malls, airports, airlines, etc. often wish to wirelessly offer Internet access to customers. To make customer access as simple as possible, often the hospitality establishment sets up a wireless access point (AP) that provides an open and unencrypted hotspot. Security options such as wired equivalent privacy (WEP), Wi-Fi Protected Access (WPA), and Wi-Fi Protected Access II (WPA2) are disabled on the AP so that customers do not need to know any password or other access credential in advance to associate (i.e., connect) their wireless device with the AP.

If the hotspot is to be limited to only certain users such as paying customers, a captive portal system is generally employed to redirect all newly associated users to a web-based login portal where payment information or user authentication information can be received before allowing access to the Internet. To ensure security of the user's payment and/or authentication information, the login portal is generally provided at a hypertext transfer protocol secure (HTTPS) uniform resource locator (URL). Once a user completes the login process, the media access control (MAC) address or the Internet Protocol (IP) address of the user's device is cleared for Internet access at the hotspot.

Although convenient, such unencrypted public hotspots are extremely insecure. Even though the login portal is usually accessed through an HTTPS URL, after successfully logging in to the hotspot and beginning to browse the Internet, all subsequent HTTP-only URLs have no network-level encryption over-the-air. This means that any malicious user within signal range of the public hotspot can listen in to the unencrypted over-the-air signals to/from other users. Hackers may easily capture sensitive information including usernames, passwords, session IDs, cookies, and any other data sent to/from these web sites.

For example, the Firefox® add-on entitled "Firesheep" demonstrates how a malicious user can hijack the session of any user of an unencrypted hotspot who is currently logged in to any of 26 popular online services including Amazon®, Facebook®, Foursquare®, Google®, The New York Times®, Twitter®, Windows Live®, Wordpress® and Yahoo®. It works by monitoring all Web traffic broadcast between wireless client devices and an access point (AP) of the unencrypted hotspot in order to detect and then spoof a session ID that is passed back and forth between the online service and the legitimate user's computer to maintain the user in a logged in state. In this way, the hacker can access the user's account on the online service even though the hacker does not know the user's password on that service. Because unencrypted hotspots do not encrypt over-the-air traffic, the session IDs of current users who are logged in to HTTP-based websites at the hotspot are easily captured.

A typical recommendation for users to better secure Internet browsing at an unencrypted hotspot is to always utilize a trusted virtual private network (VPN) service. When a wireless client device is properly configured to utilize a VPN service, the device establishes an encrypted connection with the VPN service and then sends and receives all Web traffic via this encrypted connection. In this way, even when a user's desired destination website is accessed using an unencrypted HTTP-only URL, the over-the-air web traffic between the user's wireless device and the website is encrypted due to being passed through the intermediate and encrypted VPN connection.

Although VPNs certainly increase security, most users do not use them. VPNs require some technical savvy by the user, both to recognize the need for the VPN in the first place, and to preconfigure their personal device to utilize a trusted VPN service in advance of arrival at the hotspot. Most VPN services also charge for usage and add some appreciable delay to web browsing.

Another downside to the VPN solution is that it is focused on securing the user's web traffic rather than the wireless hotspot as a whole. For example, regardless of whether the user is accessing the hotspot's secure login portal, the VPN service, banking websites, and/or any other websites accessed via an HTTPS-based URL, only the payload of packets transmitted over-the-air at the unencrypted hotspot are encrypted. Packet headers remain in the clear and include sensitive information such as the MAC and IP addresses of the user's wireless device. This unencrypted information can be utilized by hackers to steal Internet access from the hotspot such as by spoofing a MAC/IP address of a subscribed user. Hackers may also cause other problems at the hotspot by impersonating valid users according to information contained in the unencrypted packet headers.

In order to prevent the packet headers from being broadcast in the clear, the hotspot provider must activate one of the over-the-air encryption methods such as WEP, WPA, or WPA2. However, as previously mentioned, these encryption methods require the client device to first authenticate itself using a shared secret or other access credential before allowing the client device to associate with the encrypted hotspot.

To get around this problem, hospitality establishments providing public hotspots such as hotels or coffee shops often pre-configure their wireless networks to accept a single wireless password. Customers of the hospitality establishment are given the password for use while at the establishment. For example, front desk staff at a hotel provide guests of the hotel with the hotel's wireless password upon check-in, or cashier staff at a coffee shop provide customers of the coffee shop with the shop's wireless password upon drink purchase. The goal is to only allow valid users to associate with the encrypted hotspot and to ensure all traffic broadcast over the air (including the packet headers) is encrypted to prevent eavesdropping by hackers.

However, when employing a single wireless password given to all valid users, it is difficult to limit access to only the valid users of the hotspot. For example, previous guests of the hotel or previous customers of the coffee shop and anyone else who happens to know or find out the wireless password are able to wirelessly associate their devices with the encrypted hotspot and possibly steal Internet access. Manually changing the password on a periodic basis is a nuisance to staff and does not really solve the problem since anyone can use the new password until it is changed again. Furthermore, a common shared password used by all users potentially makes cryptographic analysis and cracking easier by a hacker.

IBM® has recently proposed a new system where the service set identifier (SSID) of a wireless network is its domain name and the AP sends a digital certificate to the wireless client upon connection, which validates the certificate and automatically establishes an encrypted connection with the AP when the name in the certificate is the same as the SSID domain name. Over-the-air communication is thereby encrypted without requiring the user to know a password in advance. However, IBM's proposal requires changes to both APs and client devices and therefore does not function with current state-of-the-art equipment. Operating systems such as Windows®, Mac OS X®, and Linux® also need to support the new protocol in order for a typical user to actually benefit. Hardware and/or software updates may not be possible or may be difficult with current state-of-the art equipment (e.g., already-deployed APs and client devices). Furthermore, when any user can associate with the encrypted hotspot without using any password, it is difficult for the hotspot provider to prevent invalid users such as hackers from associating as well.

Another known solution to the shared secret requirement is to activate WPA2 "Enterprise mode" security with a modified Remote Authentication Dial In User Service (RADIUS) server that allows any username and any password. In this way, wireless users can be associated with an encrypted wireless local area network (WLAN) regardless of what username/password combination they enter for authentication purposes. However, most users would not realize that any username/password will work and will therefore not even attempt to associate with a secured SSID if they are not aware of a specific password for that SSID. Additionally, when any username/password combination results in successful association with the secured network, it is difficult for the hotspot provider to prevent invalid users such as hackers from associating as well.

BRIEF SUMMARY OF THE INVENTION

In an exemplary embodiment of the invention a hotspot includes both an open wireless network and a secure wireless network. The hotspot system dynamically generates user-specific access credentials for each new user of the hotspot at a login portal. The login portal automatically provides the user-specific access credentials to each user via an encrypted hypertext transfer protocol secure (HTTPS) connection established over the hotspot's open wireless network. The user thereafter utilizes the user-specific access credentials when requesting association with the hotspot's secure wireless network. In this way, users do not need to know any password in advance in order to associate their wireless devices with the open and unencrypted wireless local area network and obtain a user-specific access credential. Furthermore, only valid users in possession of a valid access credential are able to associate their wireless devices with the hotspot's secure wireless network. Access to a resource such as the Internet over the secure wireless network is thereby protected from eavesdropping, and the hotspot system may further prevent hackers and other unauthorized users from associating their client devices with the secure wireless network according to the login process performed over an HTTPS connection.

According to an exemplary embodiment of the invention there is disclosed a method of authorizing a wireless client device for secured wireless access at a hotspot. The hotspot includes an open wireless network and a secure wireless network. The open wireless network has no network-level encryption and allows open association therewith. The secure wireless network employs network-level encryption and requires authentication of a received access credential from the client device before allowing association therewith. The method includes establishing an encrypted connection between the client device and a login portal of the hotspot over the open wireless network. The method further includes storing a user-specific access credential transmitted via the encrypted connection as a valid access credential in a credential database. The credential database is accessed by one or more wireless access points of the hotspot to authenticate the received access credential from the client device in response to a request from the client device to associate with the secure wireless network. The one or more access points are configured to only allow the client device to associate with the secure wireless network when the received access credential corresponds to one of the valid access credentials stored in the credential database.

According to another exemplary embodiment of the invention there is disclosed a system for authorizing a wireless client device for secured wireless access at a hotspot. The hotspot includes an open wireless network and a secure wireless network. The open wireless network has no network-level encryption and allows open association therewith. The secure wireless network employs network-level encryption and requires authentication of a received access credential from the client device before allowing association therewith. The system includes an access controller configured to establish an encrypted connection between the client device and a login portal of the hotspot over the open wireless network. The access controller is further configured to store a user-specific access credential transmitted via the encrypted connection as a valid access credential in a credential database. The credential database is accessed by one or more wireless access points of the hotspot to authenticate the received access credential from the client device in response to a request from the client device to associate with the secure wireless network. The one or more access points are configured to only allow the client device to associate with the secure wireless network when the received access credential corresponds to one of the valid access credentials stored in the credential database.

According to yet another exemplary embodiment of the invention there is disclosed a system for authorizing secured wireless access at a wireless hotspot. The system includes one or more wireless access points for providing both an open wireless network and a secure wireless network at the hotspot, a credential database for storing one or more valid access credentials, and an access controller coupled to the one or more access points and the credential database. The one or more access points are configured such that the open wireless network does not employ network-level encryption and allows open association by a wireless client device. The access controller is configured to establish an encrypted connection with the client device over the open wireless network, and to store a user-specific access credential transmitted via the encrypted connection as a valid access credential in the credential database. The one or more access points are configured such that the secure wireless network employs network-level encryption and only allows the client device to associate with the secure wireless network when a received access credential from the client device in a request to associate with the secure wireless network corresponds to one of the valid access credentials stored in the credential database.

According to yet another exemplary embodiment of the invention there is disclosed a method of providing secured access to a resource such as the Internet at a wireless hotspot. The method includes allowing a wireless client device to associate with an open wireless network of the hotspot, wherein the open wireless network does not employ network-level encryption. The method further includes establishing an encrypted connection with the client device over the open wireless network, and storing a user-specific access credential transmitted via the encrypted connection as a valid access credential in a credential database. The method further includes receiving a request from the client device to associate with a secure wireless network of the hotspot, wherein the secure wireless network employs network-level encryption and requires authentication of a received access credential from the client device. The method further includes allowing the client device to associate with the secure wireless network and access the resource over the secure wireless network when the received access credential matches one of the valid access credentials stored in the credential database.

According to yet another exemplary embodiment of the invention there is disclosed a system for providing secured access to a resource such as the Internet at a wireless hotspot. The system includes one or more wireless access points for providing both an open wireless network and a secure wireless network at the hotspot, a credential database for storing one or more valid access credentials, and an access controller coupled to the one or more access points and the credential database. The one or more access points are configured such that the open wireless network does not employ network-level encryption and allows open association by a wireless client device. The access controller is configured to establish an encrypted connection with the client device over the open wireless network, and to store a user-specific access credential transmitted via the encrypted connection as a valid access credential in the credential database. The one or more access points are configured such that the secure wireless network employs network-level encryption and requires a received access credential from the client device to match one of the valid access credentials stored in the credential database before allowing the client device to associate with the secure wireless network and access the resource over the secured wireless network.

According to yet another exemplary embodiment of the invention there is disclosed an apparatus for authorizing a wireless client device for secured wireless access at a hotspot having an open wireless network and a secure wireless network. The open wireless network has no network-level encryption and allows open association therewith. The secure wireless network employs network-level encryption and requires authentication of a received access credential from the client device before allowing association therewith. The apparatus includes means for establishing an encrypted connection between the client device and a login portal of the hotspot over the open wireless network, and means for storing a user-specific access credential transmitted via the encrypted connection as a valid access credential in a credential database. The credential database is accessed by one or more wireless access points of the hotspot to authenticate the received access credential from the client device in response to a request from the client device to associate with the secure wireless network. The one or more access points are configured to only allow the client device to associate with the secure wireless network when the received access credential corresponds to one of the valid access credentials stored in the credential database.

These and other advantages and embodiments of the present invention will no doubt become apparent to those of ordinary skill in the art after reading the following detailed description of the preferred embodiment that is illustrated in the various figures and drawings.

BRIEF DESCRIPTION OF THE DRAWINGS

The invention will be described in greater detail with reference to the accompanying drawings which represent preferred embodiments thereof, wherein:

FIG. 4 illustrates an example of the credential database of FIG. 1 according to an exemplary embodiment.

FIG. 5 illustrates an exemplary set of rules for the firewall of FIG. 1 to allow Internet access over the secure wireless network for cleared media access control (MAC) addresses according to an exemplary embodiment of the invention.

FIG. 8 illustrates an exemplary set of firewall rules to allow Internet access for any client device associated with the hotel's secure wireless network according to an exemplary embodiment of the invention.

FIG. 9 illustrates an exemplary set of firewall rules to allow Internet access for authorized client devices on both the open and secure wireless networks of the hotspot of FIG. 1.

DETAILED DESCRIPTION

Figure 1:
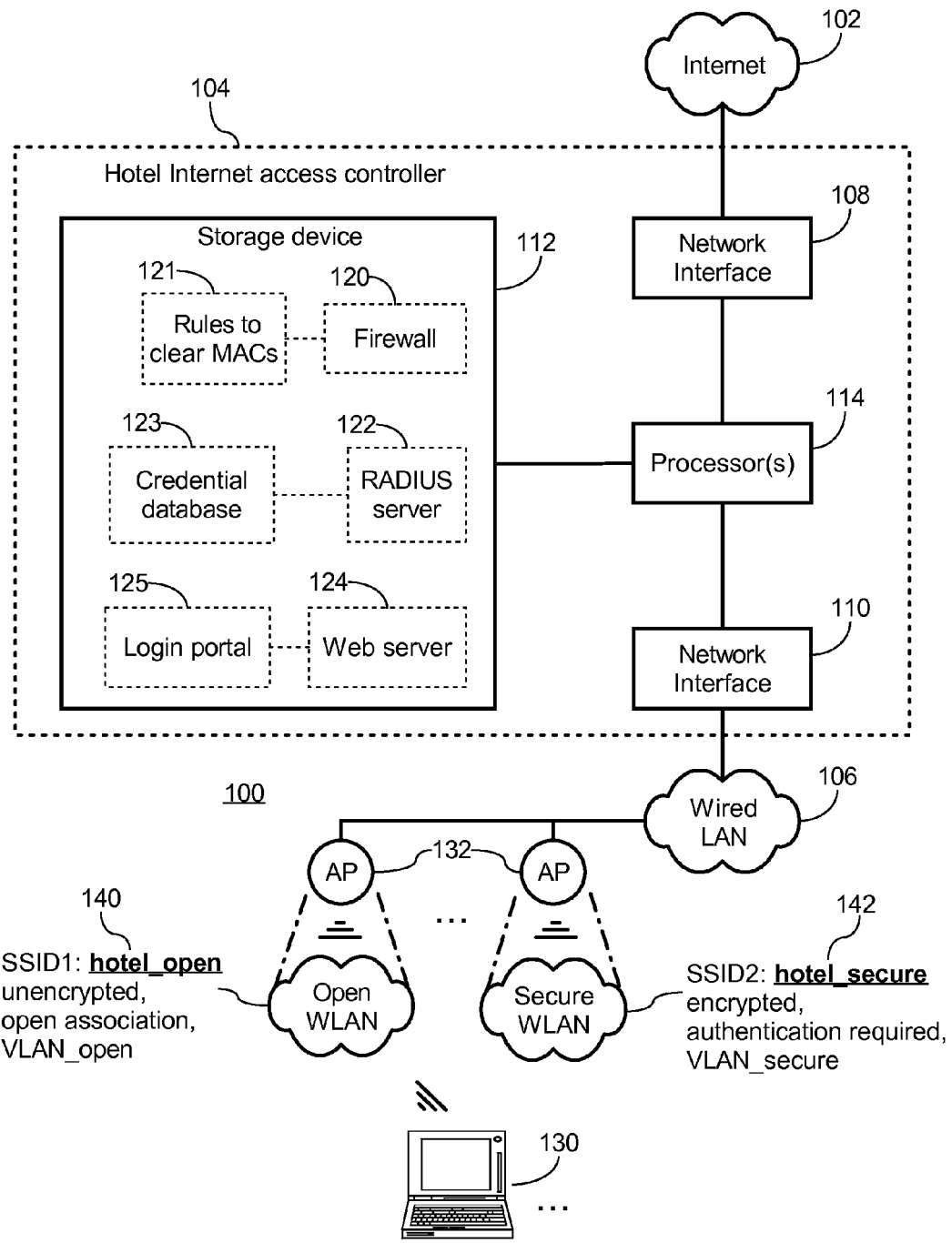
FIG. 1 illustrates a system for providing secure Internet access at a wireless hotspot according to an exemplary embodiment of the present invention.

FIG. 1 illustrates a system 100 for providing secure access to a resource at a wireless hotspot according to an exemplary embodiment of the present invention. For illustration purposes the hotspot provider in this embodiment is a hotel, and the purpose of the wireless hotspot is to allow current guests of the hotel to wirelessly access the Internet 102. However, the invention may also be beneficially employed at other types of hotspots to secure wireless access to other resources in addition to or instead of the Internet.

In this embodiment, the hotspot system 100 includes an access controller 104 coupled between the hotel's wired LAN 106 and the Internet 102. The access controller 104 in this embodiment is a computer server including a first network interface 108 coupled to the Internet 102 and a second network interface 110 coupled to the hotel's LAN 106. The access controller 104 further includes a storage device 112, and each of the network interfaces 108, 110 and the storage device 112 is coupled to one or more processors 114. In the following description, the plural form of the word "processors" will be utilized as it is common for a CPU of a computer server to have multiple processors (sometimes also referred to as cores); however, it is to be understood that a single processor 114 may also be configured to perform the below-described functionality in other implementations.

The storage device 112 stores software and data utilized by the processors 114 when controlling access between the hotel's wired LAN 106 and the Internet 102. In this example, the storage device 112 stores a firewall module 120, a Remote Authentication Dial In User Service (RADIUS) server module 122, and a web server module 124.

Briefly described, the firewall module 120 acts according to a stored rule set 121 specifying a list of cleared MAC addresses to thereby either allow or deny outgoing web traffic for particular client devices 130. Examples of client devices 130 include mobile phones, laptop computers, netbook computers, tablet computers, digital cameras, and any other electronic device that includes wireless communication circuitry. The client devices 130 may be brought to the hotspot by users such as when a hotel guest brings a mobile phone to the hotel, or may be provided to the users by the hotspot such as when a hotel provides an in-room tablet computer for use by a checked-in guest of the hotel.

The RADIUS server 122 stores valid access credentials in a credential database 123 and is queried by access points (APs) 132 at the hotspot when authenticating received access credentials from client devices 130 requesting association with the hotel's secure wireless network 142. For example, the APs 132 and the RADIUS server 122 may follow an authentication protocol such as that described for the well-known Wi-Fi Protected Access or Wi-Fi Protected Access II (WPA/WPA2) "Enterprise Mode" in conjunction with port-based network access control described by the well-known IEEE 802.1X standard.

The web server 124 acts according to a stored script (e.g. PHP hypertext preprocessor script) for providing a login portal 125 to certain client devices 130.

In this embodiment, the modules 120, 122, and 124 are implemented as software programs for execution by the processors 114 to thereby cause the access controller 104 to perform these and other functions as described further in the following. It is to be understood that the modules 120, 122, and 124 may also be implemented as hardware modules in other embodiments.

The system 100 further includes one or more access points (APs) 132 coupled to the hotel's wired LAN 106. The APs 132 are configured to provide both an open wireless network 140 and a secure wireless network 142 at the hotel's hotspot. In some embodiments, the physical area of the hotel's hotspot may include the entire hotel property; however, this is not a requirement and the hotspot may only include certain areas of the hotel such as the lobby and/or guest room areas.

In this embodiment, the APs 132 are configured such that the open wireless network 140 does not employ network-level encryption and allows open association by any wireless client device 100. This may be done by configuring the APs 132 to setup a first service set identifier (SSID) that operates without encryption (e.g., does not utilize any of WEP, WPA, or WPA2) and employs open systems authentication to allow association by any client device 130 that requests association.

The APs 132 are further configured such that the secure wireless network 142 employs network-level encryption and requires a received access credential from the client device 130 to match a valid access credential stored in the credential database 123 before allowing that client device 130 to associate with the secure wireless network 142. This may be done by configuring the APs 132 to setup a second SSID that employs WPA and/or WPA2 "Enterprise Mode" security and performs user authentication by querying the IP address and particular port of the access controller 104 utilized by the RADIUS server 122 following the above-referenced IEEE 802.1X standard. Other suitable wireless security protocols may be used instead of WPA/WPA2 "Enterprise Mode" and IEEE 802.1X in other embodiments.

In this exemplary embodiment, two APs 132 are shown respectively providing open and secure wireless local area networks (WLANs) 140, 142; however, in other embodiments a single AP 132 may provide both the open and secure wireless networks 140, 142, and/or more than two APs 132 may be distributed throughout the intended coverage area of the hotspot as required according to application-specific design requirements. Furthermore, other types of wireless networks other than WLANs may be configured to operate in a similar manner.

The specific steps required for an installer to configure the APs 132 to create the above-described open wireless network 140 and secure wireless network 142 at the hotspot depend upon the brand of the APs 132 utilized in the system 100. As the user manuals of the various brands of APs 132 are readily available to those of ordinary skill in the art; further description of the brand-specific steps to create the above-described two wireless networks 140, 142 at the hotspot is omitted herein.

The operation of the hotspot system 100 in this embodiment is briefly described as follows: A new guest of the hotel does not know the password for the hotel's secure wireless network 142 and therefore associates their client device 130 with the hotel's open wireless network 140. When the user attempts to access an Internet website over the open wireless network 140, the firewall 120 blocks the attempt and causes the web browser on the user's client device 130 to instead establish an encrypted (e.g., HTTPS) connection with the hotel's login portal 125. The login portal 125 optionally ensures the user is a current guest of the hotel such as by requiring the user to provide their last name and room number or perform another predetermined login process. The login portal 125 then generates a user-specific access credential that is passed to the RADIUS server 122 for storage as a valid access credential in the credential database 123. In this embodiment, the user-specific access credential is a unique username/password combination that is personalized for the specific guest identified by the login process. The login portal 125 further transmits the user-specific access credential to the user via the encrypted connection (e.g., HTTPS) and instructs the user to switch their client device 130 over to the SSID of the hotel's secure wireless network 142.

When the user switches to the SSID of the secure wireless network 142, they are prompted to enter a username/password during the authentication process with the APs 132 of the secure wireless network 142. The user utilizes the user-specific access credential received from the login portal 125 and this username/password entered by the user for authentication is received by the APs 132. The APs 132 query the credential database 123 and verify that the received username/password from the client device 130 correspond to a valid access credential in the credential database 123. When it does, the APs 132 allow the client device to associate with the secure wireless network 142, and the user can thereafter securely browse websites on the Internet 102 over the hotel's secure wireless network 142. In the event that the received username/password from the client device 130 does not correspond to a valid access credential in the credential database 123, the APs 132 do not allow the client device 130 to associate with the hotel's secure wireless network 142.

In this embodiment, the user is automatically provided with a user-specific access credential via an encrypted communication channel such as an HTTPS connection established with the hotspot's login portal 125 over an open wireless network 140. The user thereafter authenticates and associates their client device 130 with a secured (i.e., encrypted and authentication required) wireless network 142 using the user-specific access credential.

While users surf the Internet 102 over the hotel's secured wireless network 142, all over-the-air traffic including packet headers is encrypted and hackers are thereby prevented from eavesdropping sensitive information. Additionally, because valid users can easily obtain a user-specific access credential via an encrypted connection with the hotspot's login portal 125 over the open wireless network 140, no advanced planning is required by the user and no software/hardware updates are required for the client device 130 prior to use at the hotspot. The hotspot system 100 of this embodiment beneficially works with existing state-of-the-art APs 132, RADIUS servers 122, and client devices 130 that have hardware and software that already supports the well-known WPA/WPA2 "Enterprise Mode" of operation.

Furthermore, as the firewall 120 in this embodiment is configured to only allow client devices 130 to access the Internet 102 when they are associated with the hotel's secure wireless network 142, the above-described hotspot system 100 beneficially prevents hackers from stealing access even when they know the MAC and/or IP address of a valid user at the hotspot. For example, a hacker may be able obtain the MAC/IP address of a valid user when that valid user's client device 130 is associated with the open wireless network 140 (because over-the-air packet headers are transmitted in the clear on the open wireless network 140). However, the hacker will be unable to obtain the user-specific access credential because it is encrypted when transmitted via the HTTPS connection established between the client device 130 and the login portal 125. As only users who are in possession of a valid access credential are able to associate their client device 130 with the secure wireless network 142, the hacker cannot associate with the secure wireless network 140 and cannot obtain Internet access at the hotspot.

Figure 2:
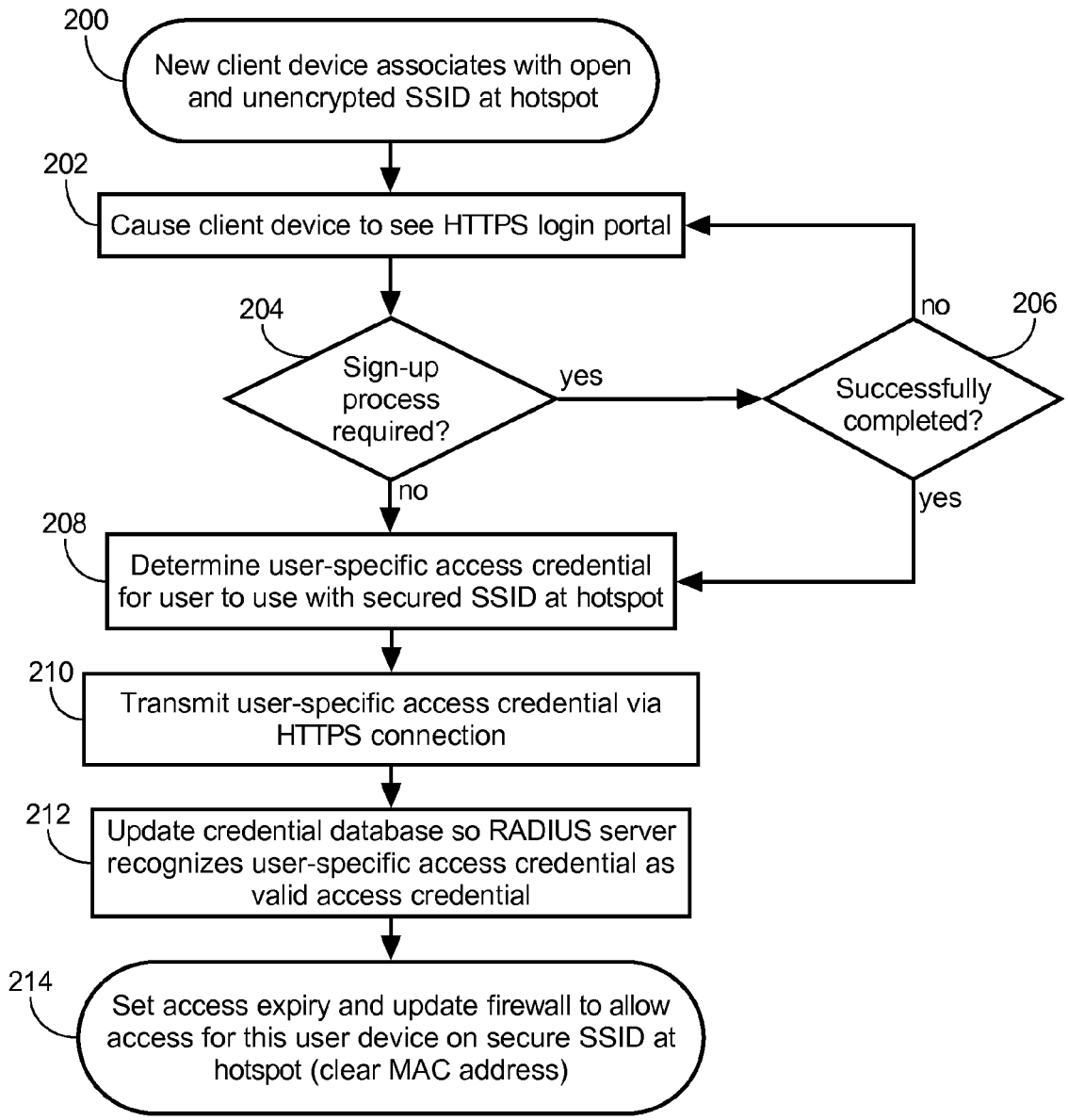
FIG. 2 is a flowchart providing details of operations performed by the access controller of FIG. 1 when a new client device associates with the open wireless network.

FIG. 2 is a flowchart providing details of operations performed by the access controller 104 of FIG. 1 when a new client device 130 associates with the hotel's open wireless network 140. The steps of the flowchart in FIG. 2 are not restricted to the exact order shown, and, in other embodiments, shown steps may be omitted or other intermediate steps added. In this embodiment, the processors 114 execute the firewall module 120, the RADIUS server module 122, and the web server module 124 in order to cause the access controller 104 to perform the illustrated steps.

The process begins at step 200 when a new client device 130 is associated with the hotel's open wireless network 140. This may occur, for example, when a new guest at the hotel selects the SSID of the open wireless network 140 for association by their wireless client device 130. The specific SSID of the open wireless network 140 may be chosen by the hotspot provider to make it clear that guests should associate with that network 140, for example, the SSID of the open wireless network 140 may be the hotel's name followed by "-Open wireless network". Upon arrival at the hotel, the guest in this example is assumed to not be in possession of valid access credentials for the secure wireless network 142 and is therefore unable to associate with the hotel's secure network 142.

At step 202, the firewall module 120 forces the web browser running on the client device 130 to establish an encrypted connection with the access controller 104 and to display a predetermined login portal 125 of the hotel as provided by the web server 124. Well-known URL redirection techniques may be utilized at this step to redirect the user device's web browser to a predetermined address (e.g., URL or IP address) of the web server 124 providing the login portal 125 rather than that of the user's desired external web site on the Internet 102. For example, well-known HTTP status codes of the form 3XX, server side redirection scripts, refresh meta tags and HTTP refresh headers, JavaScript redirects, or frame redirects may be employed at this step. Additionally, U.S. patent application Ser. No. 13/402,198 (published as U.S. Patent Application Publication No. 2012/0246553, now issued U.S. Pat. No. 8,650,495) naming inventor David Ong filed Feb. 22, 2012 and incorporated herein by reference describes techniques of causing a client device 130 to display a predetermined login portal without requiring a browser redirection message.

At step 204, the login portal 125 determines whether a login or other sign-up process is required for the user. For an unrecognized client device 130, user authentication may be desirable at this step to ensure only valid users are able to receive Internet access at the hotspot. Other embodiments may require the user to create an account or otherwise sign up for Internet access and/or agree to terms and conditions. Payment for Internet may be required at some hotspots. When a user login or other sign-up process is required, control proceeds to step 206. Otherwise, when no sign-up process is required such as in a free hotspot that provides Internet to any user within range or when the user has already logged in and is recognized (e.g., by reading a cookie previously placed on the user's client device 130 by the login portal 125), control proceeds directly to step 208.

At step 206, the login portal 125 determines whether the required sign-up process was successfully completed. For example, in this embodiment where the hotspot is provided at a hotel, the login portal 125 requires the user of the client device 130 to enter their last name and room number for guest authentication purposes. The login portal 125 then validates this information by querying a property management system (PMS) of the hotel to ensure the last name and room number received from the client device 130 match that of the current guest of the room as stored in the hotel's PMS. When yes, the guest is deemed to be a valid user and the sign-up process is successfully completed.

In other embodiments, the login portal 125 may require payment from the user and the sign-up process will not be deemed completed until payment is successfully received. The user may make the payment by providing credit information to the login portal, which then verifies the payment is successful in real time. As the client device 130 is connected to the login portal via an encrypted (e.g., HTTPS) connection, personal information such as names and credit card numbers transmitted at this step remain secure even though they are transmitted over the open wireless network 140.

When the sign-up process is completed successfully, control proceeds to step 208; otherwise, control returns to step 202 where the user is again presented with the login portal 125. The login portal 125 may also place a cookie or other identifier on the client device 130 after the sign-up process is successfully completed to allow automatic identification of this client device 130 and prevent the need for the user to re-login in the future. Again, as the client device 130 is connected to the login portal via an encrypted (e.g., HTTPS) connection, the cookie remains secure from hackers even though it is transmitted over the open wireless network 140.

At step 208, the login portal determines a user-specific access credential for the user to use when associating with the hotel's secure wireless network 142. In this embodiment, the login portal 125 generates a username and a pseudo-random password as the user-specific access credential at this step. In a preferred embodiment, the access credential should be temporally unique to the user meaning no other current user of the hotspot is assigned a matching access credential in the credential database 123.

It is not required that the login portal 125 must itself generate the user-specific access credential at this step. In other embodiments, the user-specific access may be provided by the user as a part of the login process at steps 204 and 206. For example, the login portal 125 may request the user to choose their own username and password. The chosen username and password are then transmitted across the secure HTTPS connection from the client device 130 to the login portal 125.

In yet other embodiments, part of the user-specific access credential such as the password may be supplied by the user while the login portal 125 generates another part such as a unique username. Again, when either the login portal 125 and/or the client device 130 transmits the user-specific access credential or a part thereof over the open wireless network 140, the transmission is via an encrypted HTTPS connection so the user-specific access credential remains protected from hackers.

In yet other embodiments, the login portal 125 may load the user-specific access credential at this step rather than generating it or receiving it from the client device 130. For example, the user may have already specified in a hotel reservation their own user-specific access credential, which is stored in a reservation database accessible by the login portal 125. At step 208, the login portal 125 accesses the reservation database in order to load the user-specific access credentials for the specific guest. The guest's identity may be determined as a part of the login process performed at steps 204 and 206. A benefit of this embodiment is that the same user-specific access credential may be passed to the user via a plurality of user-specific communication channels. For example, the user-specific access credential may have been previously sent to the user as a part of the reservation confirmation, may further be displayed by the access controller 104 or other media system controller on an in-room television in the guest's registered room at the hotel, and/or may further be transmitted from the login portal 125 to the user via the user interface (UI) screen 300 shown in FIG. 3. Further description of this latter embodiment is provided below with regard to step 210.

At step 210, in this embodiment, the login portal 125 transmits the user-specific access credential determined at step 208 to the client device 130 via the encrypted connection (e.g., HTTPS connection between login portal 125 and client device 130).

Figure 3:
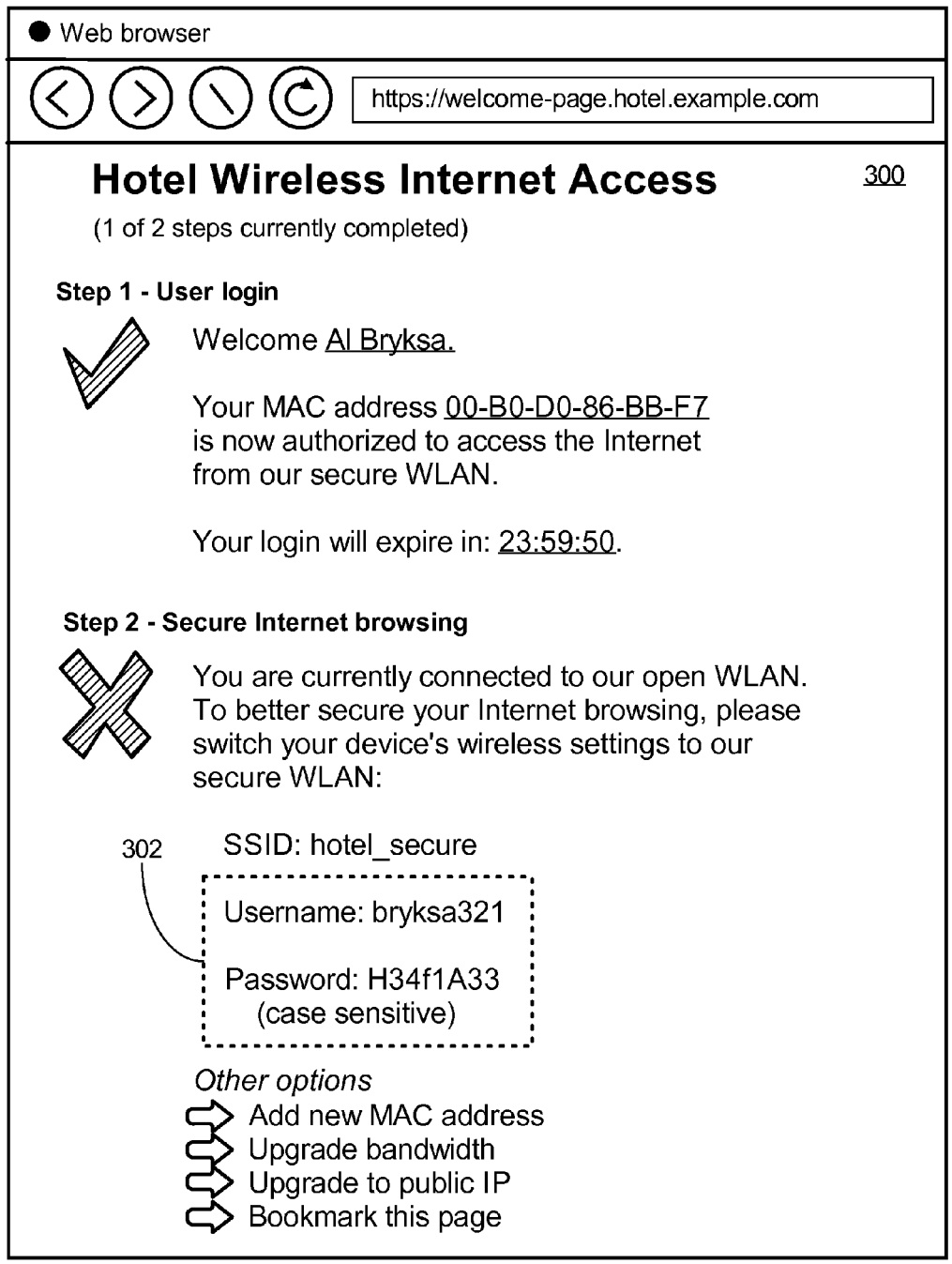
FIG. 3 illustrates a user interface (UI) screen generated by the login portal to transmit the user-specific access credential to the client device.

FIG. 3 illustrates a UI screen 300 generated by the login portal 123 to transmit the user-specific access credential 302 to the client device 130. In this embodiment, the UI screen 300 is displayed by the client device 130 in a web browser. As shown, a newly generated user-specific access credential 302 in this example includes a username portion and a password portion.

In other embodiments, the user-specific access credential or a part thereof may also be transmitted from the client device to the login portal via the encrypted connection (e.g., when the user is allowed to choose their own username and/or password). In these embodiments, the UI screen 300 may have text or password input fields at the position of the user-specific access credential 302, and may include a "Submit" button that, when clicked, causes the client device 130 to transmit the chosen user-specific access credential from the client device 130 to the login portal over an HTTPS connection.

Returning again to FIG. 2, at step 212 the login portal 125 passes the user-specific access credential transmitted via the encrypted connection at step 210 to the RADIUS server 122 to be stored as a valid access credential in the credential database 123.

FIG. 4 illustrates an example of the credential database 123 of FIG. 1 according to an exemplary embodiment. In this embodiment, a relational database is utilized to store the credential database 123; however, the term "database" as utilized in this description is meant to refer to any stored collection of organized data.

As shown in FIG. 4, the credential database 123 is organized in this embodiment as a table having user-specific access credentials stored in rows. A first column 400 stores the username, a second column 402 stores the password, a third column 404 stores an expiry date/time, and a fourth column 406 stores a unique client ID. Other additional or substitute columns may be utilized in other embodiments according to the desired format of the access credentials. For instance, in other embodiments, the user-specific access credential may only include a unique passkey, or may be formed by other types of values such as an electronic room key or other access code. The columns of the credential database 123 may be chosen accordingly in these embodiments.

In the exemplary embodiment of FIG. 4, the username and password combination stored on the same row in columns 400 and 402 form a valid access credential that may be utilized to authenticate with the hotel's secure wireless network 140.

Continuing with the example user-specific access credential 302 shown in FIG. 3, at step 212 of FIG. 2 the RADIUS server 122 adds this new user-specific access credential 302 (e.g., username/password combination of "bryksa321/H34f1A33") to the credential database 123. The expiry time specified in column 404 represents the duration of Internet access for this client device 130 and is set by the login portal 125 to "May 5, 2012 18:00" in this example, which corresponds to 24-hours from the current time in the example that the guest is booked for a single night at the hotel. Other expiry durations may be utilized in other embodiments.

The client ID is a unique identifier generated by the login portal 125 and utilized to correlate firewall rules 121 specifying Internet access for this client device 130 with the corresponding user-specific access credential 302. The client ID may further be stored as a secure cookie on the client device 130 to help automatically identify the client device 130 at a next time it loads the login portal 125. (See previous description of step 204, for example)

At step 214 the login portal 125 passes the MAC address (or another device identifier such as the IP address, subscriber card identifier, etc.) of the client device 130 to the firewall 120 in order to clear the MAC address for access to the Internet 102 when the client device 130 is associated with the hotel's secure wireless network 142.

FIG. 5 illustrates an exemplary set of rules 121 for firewall 120 to allow Internet access for the cleared MACs according to an exemplary embodiment of the invention. The firewall rules 121 are organized as a table and are checked by the firewall module 120 each time outgoing network traffic is received from the hotel's wired LAN 106 in an order starting at the top and proceeding down the list of rules. The firewall 121 acts according to the first rule that matches the outgoing network traffic.

In this embodiment, the APs 132 are configured to place network traffic from client devices 130 that are associated with the open wireless network 140 on a first VLAN (e.g., $VLAN_{13}open$), and to place network traffic from client devices 130 that are associated with the secure wireless network 140 on one or more second VLANs (e.g., VLAN$_{13}$secure in FIG. 5). In addition to segregating traffic from the open and secure wireless networks 140, 142 on different VLANs for security purposes, the different VLAN tags allow the firewall 120 to easily identify the source VLAN.

When the source VLAN in column 502, the target location in column 504 and the MAC address in column 506 match incoming network traffic, the firewall 120 performs the action specified in column 508, i.e., either allows the network traffic or drops the network traffic and redirects the client device 130 to the login portal 125. The default rule 512 at the bottom blocks Internet access and redirects to the login portal 125 regardless of the source VLAN and MAC address when none of the previous rules match. Other rules may be present in other embodiments according to application-specific requirements. For example, incoming network traffic rules may also be present and may be different than the outgoing network traffic rules etc.

As a result of default rule 512, the firewall 120 is configured to block network traffic between the VLAN_open (i.e., network traffic that is passed over the open wireless network 140) and the Internet 102. Only client devices 130 that are able to associate with the hotspot's secure wireless network 142 have the possibility of accessing the Internet 102. Additionally, in this embodiment, only client devices 130 that have their MAC addresses specifically cleared on the firewall rules 121 for VLAN_secure are authorized for Internet access. If a client device 130 does not have its MAC address specifically cleared for Internet access, even if it is currently associated with the secure wireless network 142, default rule 512 ensures its outgoing network traffic is still blocked and that it is redirected by the firewall 120 to the hotel's login portal 125.

Although a hacker may be able to see the MAC/IP addresses of valid users as they are transmitted in packet headers in the clear while client devices 130 are associated with the open wireless network 140, hackers are unable to capture the user-specific access credentials transmitted across the encrypted connection at step 210 (e.g., HTTPS connection established between the client device 130 and the login portal 125). As hackers are not in possession of a valid access credential, they are unable to associate with the hotel's secure wireless network 142. Therefore, even if they spoof a valid client's MAC/IP address on the open wireless network 140, all network traffic from the hacker will be isolated on the VLAN_open and every outgoing request from the hacker's client device 130 will be blocked in accordance with default rule 512. In this embodiment, the only web site the hacker can access over the open wireless network 140 is the hotel's login portal 125.

Figure 6:
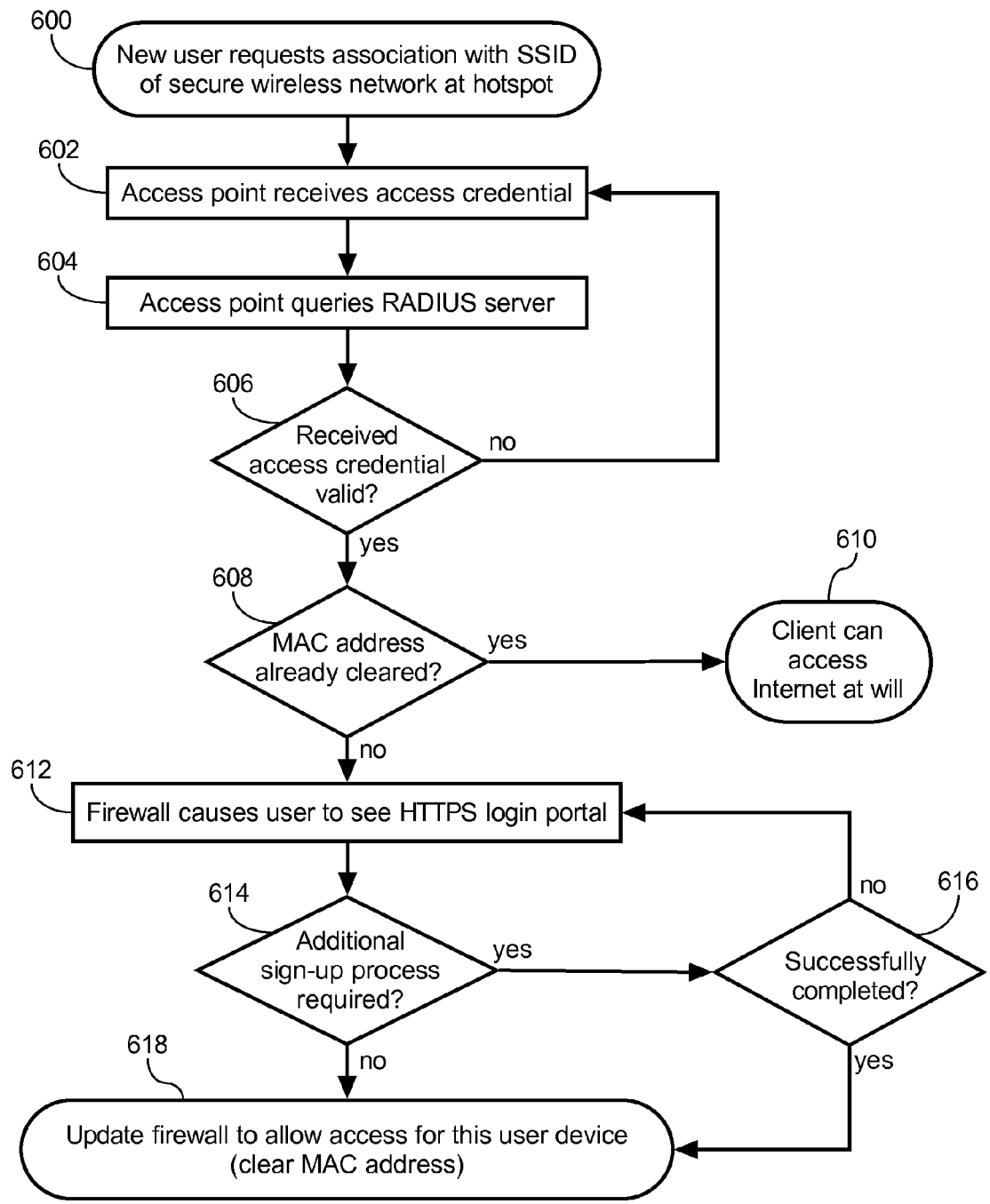
FIG. 6 is a flowchart describing operations performed by the hotspot system of FIG. 1 in order to provide secure access to a resource such as the Internet to an authorized client device over the secure wireless network.

FIG. 6 is a flowchart describing operations performed by the hotspot system 100 of FIG. 1 in order to provide secure Internet access to client device 130 over the secure wireless network. The steps of the flowchart of FIG. 6 are not restricted to the exact order shown, and, in other embodiments, shown steps may be omitted or other intermediate steps added. In this embodiment, the access controller 104 and the APs 132 at the hotspot perform the illustrated steps as indicated below.

The process begins at step 600 when a new client device 130 is associated with the hotel's secure wireless network 142. This may occur, for example, after step 214 of FIG. 2 when a user follows the instructions to switch to the SSID of the hotel's secure wireless network as provided by an AP 132 at the hotspot. The user disconnects the client device 130 from the SSID for the open wireless network 140 and requests association with the SSID for the secure wireless network 142 as specified in UI screen 300.

At step 602, the AP 130 initiates an encrypted authentication process and receives an access credential from the client device 130 for authentication. For example, when required to input a username/password combination to authenticate with the secure wireless network 142 (e.g., utilizing WPA/WPA2 "Enterprise Mode" authentication), the user inputs the same user-specific access credential 302 as specified in the UI screen 300.

At step 604, the AP 130 automatically queries the RADIUS server 122 to authenticate the received access credential from the client device 130. In an exemplary embodiment implementation, the AP 130 acts as an authenticator while following the authentication process laid out in IEEE 802.1X.

At step 606, the RADIUS server 122 determines whether the received access credential is a valid access credential according to information stored in the credential database 123. With reference to FIG. 4, when the received username and password combination match a valid access credential stored in the credential database 123 (e.g., on columns 400, 402), the RADIUS server 122 replies to the AP 132 certifying that the access credential is valid. In an exemplary embodiment implementation, the RADIUS server 122 acts as an authentication server while following the authentication process laid out in IEEE 802.1X.

When the received access credential is a valid access credential, the AP 132 allows the client device to associate with the secure wireless network 142 and the process proceeds to step 608. Otherwise, when the received access credential is not a valid access credential, the AP 132 does not allow the client device 130 to associate with the secure wireless network 142 and the process returns to step 602 after a predetermined delay period (to slow down brute force password guessing attempts).

At step 608, outgoing network traffic is received at the firewall 120 from the client device 130. When the MAC address of the client device 130 specified in the network traffic is cleared for Internet access from VLAN$_{13}$secure according to the firewall rules 121 of FIG. 5, the process proceeds to step 610; otherwise, when the MAC address of the client device 130 is not specifically cleared for Internet access in the firewall rules 121, the default rule 512 applies and the process proceeds to step 612.

At step 610, the firewall 120 allows the outgoing network traffic to pass to the Internet 102. At this point the client device 130 can securely browse web sites on the Internet 102 over the hotspot's secure wireless network 142. Because the client device 130 is associated with the secure wireless network 142, all information transmitted over-the-air including packet headers and payload data is encrypted and secure from hackers. Additionally, because only client devices 130 that authenticate with valid access credentials are permitted to associate with the secure wireless network 142, hackers are unable to pretend to be a client device 130 currently associated with the secure wireless network 142 (i.e., by spoofing the IP or MAC address of a valid client device detected on the open wireless network 140).

At step 612, because the MAC address of the client device 130 is not specifically cleared for Internet access, the firewall 120 follows the default rule 512 described previously to 1) block the outgoing request, and 2) cause the client device 130 to display the hotel's login portal 125. This step corresponds to step 202 in FIG. 2 and may be performed by the firewall 120 in a similar manner.

At step 614, the login portal determines whether an additional login and/or sign-up process is required. Similar to step 204 of FIG. 2, user authentication after the client device 130 is already associated with the secure wireless network 142 may be desirable to ensure that only current users are able to receive Internet access at the hotspot. For example, although the user is already associated with the secure wireless network 142, the user's Internet access period may have already expired, which resulted in the firewall rules 121 being modified to no longer clear the MAC address of the user's client device(s) 130 for Internet access (e.g., see step 702 of FIG. 7 described below).

In another example specifically related to a hotel, the user may have already checked out of their hotel room and therefore lost free access to the Internet 102. In these types of situations, the user may be required to perform an additional sign-up process which may include the user making a further payment at the login portal 125 in order to continue receiving Internet access at the hotspot. The additional sign-up process at this step includes such payment requirements and other additional sign-up requirements. When the user is required to perform an additional login or sign-up process, the flowchart proceeds to step 616.

When no additional sign-up process is required such as in a hotspot that permits Internet 102 access to any client device 130 that is able to associate with the secure wireless network 142, the process proceeds to step 618. This embodiment may be useful when a user has multiple devices and performed the initial login process utilizing a different wireless device (i.e., having a different MAC address). When the user thereafter associates another client device 130 with the secure wireless network 142 (using the same user-specific access credential already known to the user), the MAC address of the new client device 130 is automatically cleared for Internet access on the firewall rules 121 by the login portal 125 proceeding from step 614 directly to step 618. In some embodiments, this is done automatically by the login portal 125 before forwarding the user to their intended destination website and is therefore transparent to the user.

At step 616, when the additional sign-up process is successfully completed, the process proceeds to step 618; otherwise, the process returns to step 612 and the client device 130 is forced to retry the additional sign-up process. An example of when the additional sign-up process may not be completed successfully is when a credit card payment from the user fails.

At step 618, the login portal 125 passes the MAC address (or another device identifier such as IP address) of the client device 130 to the firewall 120 in order to clear the MAC address for access to the Internet 102 when the client device 130 is associated with the secure wireless network 142. This step may be performed by the login portal 125 updating the firewall rules 121 similar to as previously described for step 214 of FIG. 2. In some embodiments, this step may also include the login portal 125 extending the expiry time in column 404 for the user-specific access credential of the identified user. For example, when the user successfully purchases another 24-hours of Internet access at step 615, the expiry time in column 404 for the user-specific access credential of this user is also extended by 24-hours.

Figure 7:
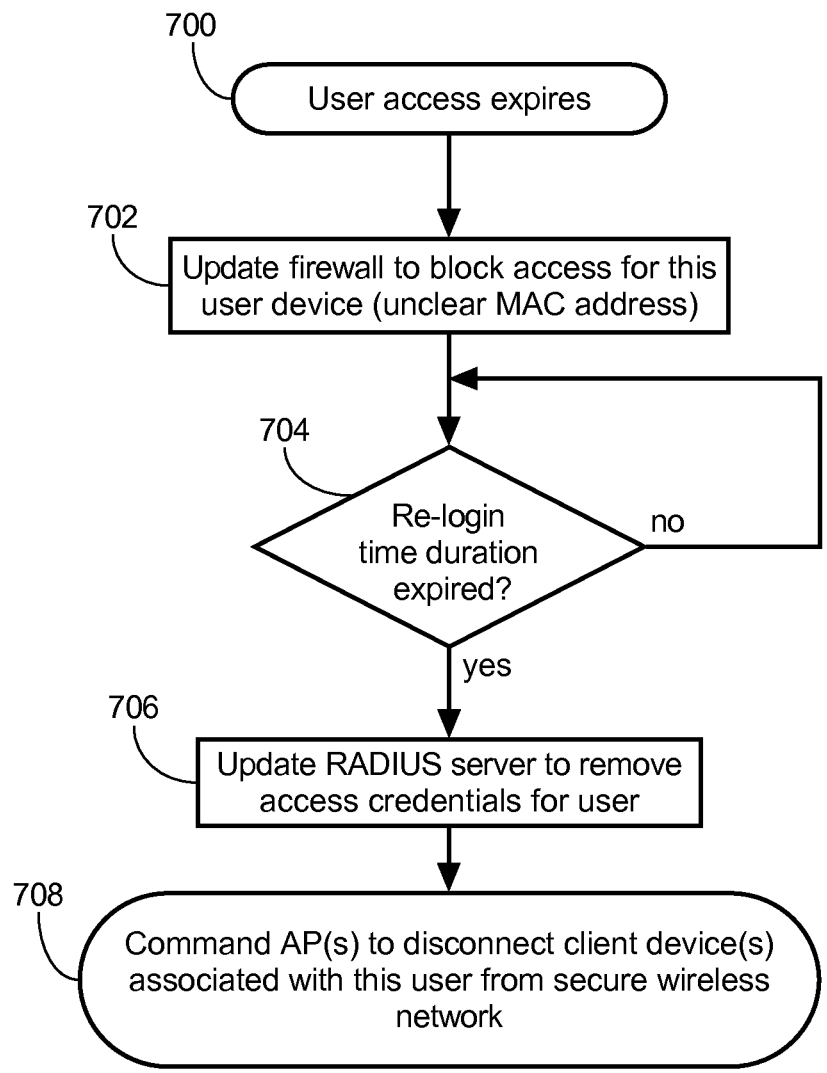
FIG. 7 shows steps performed by the access controller of FIG. 1 when a user-specific access credential expires.

FIG. 7 shows steps performed by the access controller 104 when a user-specific access credential expires. For example, this may occur when a user's purchased Internet time expires. The steps of the flowchart of FIG. 7 are not restricted to the exact order shown, and, in other embodiments, shown steps may be omitted or other intermediate steps added. In this embodiment, the login portal 125 or another control module within the access controller 104 performs the illustrated steps.

The process begins at step 700 when the login portal 125 determines that a user-specific access credential has expired. For example, this step may be performed by the login portal 125 querying the RADIUS server 122 in order to return the client IDs in column 406 for all rows having an expiry time 404 that precedes the current time. The login portal 125 may periodically perform this search, for example, expired access credentials may be identified every five minutes. In the following description it will be assumed that a single access credential has expired (e.g., the user-specific access credential marked with reference numeral 302 in FIG. 4); however, in practice more than one access credential may have expired and the following steps may be performed for each expired access credential.

At step 702, the login portal 125 updates the firewall rules 121 to remove the rule allowing Internet access for the same client ID as the expired access credential. For ease of illustration and with reference to FIG. 4 and FIG. 5, assume the process begins at step 700 because the user-specific access credential 302 for client ID "6" in column 406 of the credential database 123 in FIG. 4 has expired. The login portal 120 therefore deletes the firewall rule(s) 121 associated with client ID "6" in column 500 (e.g., row 510 in FIG. 5) while also temporarily storing the specific MAC addresses of this row 510 in column 506 for future reference if needed (e.g., see later description of step 708). In this way, each of the client devices 130 associated with the expired access credential 302 are blocked from the Internet 102 because the rule(s) clearing them for Internet access are removed from the firewall rules 121. However, note that, in this embodiment, the user-specific credential 302 associated with this client ID (client ID "6" in this example) remains stored as a valid credential in the credential database 123 for a predetermined re-login time duration after it has already passed its expiry time in column 404.

At step 704, the login portal 125 performs other tasks while waiting for the predetermined re-login time duration to expire. The purpose of this step is to give the user enough time to re-login at the login portal 125, for example, to proceed from step 612 to step 618 in the flowchart of FIG. 6. The re-login time duration may be any suitable time period greater than the time required for a typical user to complete the login process, for example, ten minutes or thereabout will often be sufficient. In this way, a user that had already associated their client device 130 with the secure wireless network 142 stays connected while re-logging in (or making a further payment etc.) without being forced to switch their client device 130 immediately back to the SSID of the open wireless network 140 just for the purpose of re-login. Additionally, during the re-login time duration, the user may continue utilizing their user-specific access credential 302 to associate with the secure wireless network 142 using other client devices 130.

When the re-login time duration has expired and assuming the user has not re-logged in to the login portal 120, the process proceeds to step 706; otherwise, the process remains at this step to give the user more time.

Although not directly illustrated in FIG. 7, in the event that the user does re-login and gain additional access prior to expiry of the re-login time duration, the login portal 125 will generally follow the flowchart of FIG. 6 as previously described starting at step 612. At step 618, the expiry time in column 404 for the user-specific access credential 302 associated with this user is extended and the expiry process of FIG. 7 is canceled. However, in the remaining description of FIG. 7, it is assumed that the user does not re-login and therefore the expiry process outlined in FIG. 7 continues to step 706.

At step 706, because the user-specific access credential 302 has expired (resulting in the process beginning at step 700) and because the user has not re-logged in at the login portal 125 within the predetermined re-login time duration at step 704, the login portal 125 instructs the RADIUS server 122 to update the credential database 123 by deleting the user-specific access credential 302 for the expired client ID. For example, assuming again that the user-specific access credential 302 for client ID "6" in FIG. 4 has expired, the login portal 125 now causes the RADIUS server 122 to delete this row from the credential database 123. In this way, the user will no longer be able to associate their client devices 130 with the hotel's secure wireless network by authenticating with the previously assigned (and now deleted) user-specific access credential 302.

At step 708, the login portal 125 sends command(s) to one or more of the APs 132 at the hotspot to disconnect the client device(s) 130 associated with the expired access credential 302 from the secure wireless network 142. As previously mentioned, the MAC address(es) associated with the same client ID as the expired access credential 302 (associated with client ID "6" in this example) were temporarily stored at step 702 and are now utilized by the login portal 125 at this step to disconnect these client devices 130 from the secure wireless network 142.

In a simple hotspot having a single AP 132 that provides the secure wireless network 142, the login portal 125 sends the disconnect command(s) at this step to that single AP 132. In a more complex deployment having multiple APs 132 providing the secure wireless network 142 throughout different areas of the hotspot, the login portal 125 may send the disconnect command(s) to all APs 132, or may automatically determine the specific source APs 132 to which the expired client devices 130 are currently associated and then send the disconnect command(s) to only those affected source APs 132.

One way to determine the particular source APs 132 to which the expired client devices 130 are currently connected involves the login portal 125 utilizing the MAC addresses stored at step 702 for performing a port mapping process. In this exemplary embodiment, the login portal 125 queries one or more switches of the hotel's wired LAN 106 using simple network management protocol (SNMP) in order to find the originating switch ports that have recently received or sent traffic to/from the specific MAC addresses, which can thereafter be traced back to their source APs 132 by automatically referring to a network map. Once the source APs are found, the login portal 125 sends the disconnect command(s) to only these source APs 132.

The disconnect command(s) may be sent by the login portal to the affected APs 132 utilizing simple network management protocol (SNMP) or another remote configuration protocol (e.g., command line access secure shell [SSH], Telnet, web configuration, etc.). The purpose of the commands is to cause the APs 132 to disconnect the client devices 130 having the expired MAC addresses. In this way, the client device(s) 130 associated with the expired access credential 302 are no longer associated with (i.e., connected to) the hotel's secure wireless network 142 and cannot re-associate using the expired access credential 302 because it was removed from the credential database 123 at step 706. The expiry process of FIG. 7 ensures that previous guests of the hotel are disconnected from the secure wireless network 142 and cannot reconnect after they are no longer valid users (e.g., after they are checked out of hotel or their paid-for Internet access duration has expired etc.)

In this embodiment, if the user of a client device 130 that is disconnected from the secure wireless network at this step needs to regain secure access to the hotspot, they must switch their client device 130 to associate with the SSID of the hotspot's open wireless network 140 and perform the login process at the login portal 125 over the open wireless network 140. This would begin the previously described flowchart of FIG. 2 at step 200 and may involve the determination of a new user-specific access credential or may involve re-activating (i.e., storing as a valid access credential in the credential database 123) the same user-specific access credential that was previously associated with the user.

FIG. 8 illustrates an exemplary set of firewall rules 121 to allow Internet access for all client devices 130 that are associated with the hotel's secure wireless network 142 according to an exemplary embodiment of the invention. In this embodiment, the access controller 104 employs firewall rules 121 that contain a first rule 800 allowing outgoing Internet access for any client device 130 that is on VLAN_secure, which affects all client devices 130 associated with the hotel's secure wireless network 142. Similar to the previously described embodiment, the firewall rules 121 also include a second rule 802 that drops all outgoing network traffic from client devices 130 that are on the VLAN_open, which affects all client devices 130 associated with the hotel's open wireless network 140. Each of the client devices 130 on the VLAN_open is presented with the login portal 125. Only when the client device 130 is later associated with the secure wireless network 142 can it access the Internet 102.

An advantage of the embodiment of FIG. 8 is that the firewall rules 121 remain static and are not updated during operation of the system 100. The login portal 125 simply adds and removes user-specific access credentials to the credential database 123 as previously described, and Internet access is available to any client device 130 that is associated with the hotspot's secure wireless network 142.

FIG. 9 illustrates an exemplary set of firewall rules 121 to allow Internet access for authorized client devices 130 on both the open and secure wireless networks 140, 142. In this embodiment, rule 902 ensures that unauthorized client devices 130 on the hotel's open wireless network 140 have their outgoing network traffic blocked and are redirected to the login portal 125.

After successful login at steps 204 and 206 in FIG. 2, newly authorized client devices 130 have their MAC addresses cleared for Internet access at step 214 so that they may browse the Internet even while staying associated with the open wireless network 140. UI screen 300 continues to provide users with a user-specific access credential 302 and recommends that the user switch to the secure wireless network 142 for a safer browsing experience; however, switching to the secure wireless network 412 is not mandatory in order to browse the Internet 102. Guests may make the decision themselves of whether to switch to the secure wireless network 142 depending on their desire for increased security compared with the convenience of staying on the open wireless network 140 to which their client device 130 is already connected. In this embodiment, all client devices 130 that are associated with the hotel's secure wireless network 142 are cleared for Internet access (e.g., as a result of rule 900), while only specifically authorized client devices 130 that are associated with the hotel's open wireless network 140 are cleared for Internet access.

An advantage of the embodiment of FIG. 9 is that users are not forced to switch to the SSID of the secure wireless network 142 before being able to browse the Internet. Instead, switching to the SSID of the secure wireless network 142 is an option made available at the hotspot for users that are concerned about security.

Combinations of the various exemplary firewall rules 121 of FIGS. 5, 8, and 9 may be employed in other embodiments. For example, specific exceptions for each cleared MAC address on the hotel's open wireless network 140 (VLAN- _open) similar to as shown in FIG. 9 may also be added by the login portal 125 to the firewall rules 121 shown in FIG. 5. In this way, users that have completed the login process can browse the Internet from both the hotel's open and secure wireless networks before their user-specific access credential 302 expires. Users concerned with security may switch to the SSID of the secure wireless network 142 and authenticate using their user-specific access credential. Additionally, by the login portal 125 removing the specific firewall rules 121 clearing the IP/MAC address of a particular client device 130 from Internet access on both the open and secure wireless networks 140, 142, the user may be caused to again see the login portal 125. This may be beneficial in order to receive additional payments from the user for continued access after time expiry, for example.

In yet other embodiments, some users may be able to browse the Internet 102 over the open wireless network 140 while the login portal 125 may dynamically configure the firewall rules 121 to force certain other users to switch to the SSID of the secure wireless network 142 after login in order to gain access to the Internet 102. This may be required and automatically enforced by the login portal 125 for particular areas, events, groups, users, etc. For example, a company concerned about security of corporate information may indicate in a hotel reservation of one of its employees that wireless Internet access is only to be provided to that employee on the hotel's secure wireless network 142.

In some embodiments, after a user has successfully associated with the secured SSID, the access controller 104 automatically blocks the same MAC address from associating with the open wireless network 140. This may be done by the access controller 104 sending one or more commands to the APs 132 to configure MAC address filtering on the open wireless network 140 after detecting packets from the client device 130 on VLAN-secure. This further helps to prevent hackers from trying to steal Internet access and/or causing other problems at the hotspot by spoofing the MAC address of a valid user on the open wireless network 142. The rationale of this embodiment is that when a client device 130 having a particular MAC address is currently associated with the secure wireless network 142 then a client device 130 having the same MAC address should not simultaneously be associated with the open wireless network 140.

To further increase security, in other embodiments, the SSID of the secure wireless network 142 may be hidden (i.e., not automatically broadcast in a beacon from the APs 132). Alternatively or in addition, each user may be assigned a unique SSID for the secure wireless network 142 that is dynamically added at the APs 130 by the login portal 125 specifically for the user; the label of the user's SSID may be sent to the user as a part of the user-specific access credential 302 on the UI screen 300.

In another embodiment, the user-specific access credential 302 is established via the encrypted connection (e.g., HTTPS connection) over the open wireless network 140 between the login portal 125 and a non-human user such as a predetermined application running on a client device 130. For example, upon recognizing that the user has arrived at a supported hotspot, the application may automatically associate the user's client device 125 with the hotel's open wireless network 140, establish an encrypted connection with the login portal 125 over the open wireless network 140, and retrieve the user-specific access credential 302 from the login portal 125 via the encrypted connection or send the user-specific access credential 302 to the login portal 125 via the encrypted connection. The transmitted user-specific access credential 302 may then be automatically presented to the user along with a message instructing the user how to connect to the secure wireless network 142 using the transmitted credential.

Alternatively, the login portal 125 may trigger the client device 130 (or an application running on the client device 130) to automatically associate with the secure wireless network 142 using the transmitted user-specific access credential 302. This may be done by the login portal 125 sending a predetermined command to the client device 125 or by sending the user-specific access credential to the client device 125 formatted utilizing a predetermined format, for example. In this way, the process of gaining secure access over the hotel's secure wireless network 142 is automated and does not involve the user manually switching to the SSID of the secure wireless network 142.

In some embodiments, the access controller is implemented within a firewall, gateway, network address translation (NAT), proxy server, or other networking component that controls the flow of network traffic between the wireless networks 140, 142 and the Internet 102. The invention may also co-exist with other control functions provided by these networking components such as providing website filtering, captive portal functionality, access controls, parental monitoring, logging etc. Other network components may also perform functions of the access controller and it is not necessary that the hotspot has a dedicated access controller located locally.

Figure 10:
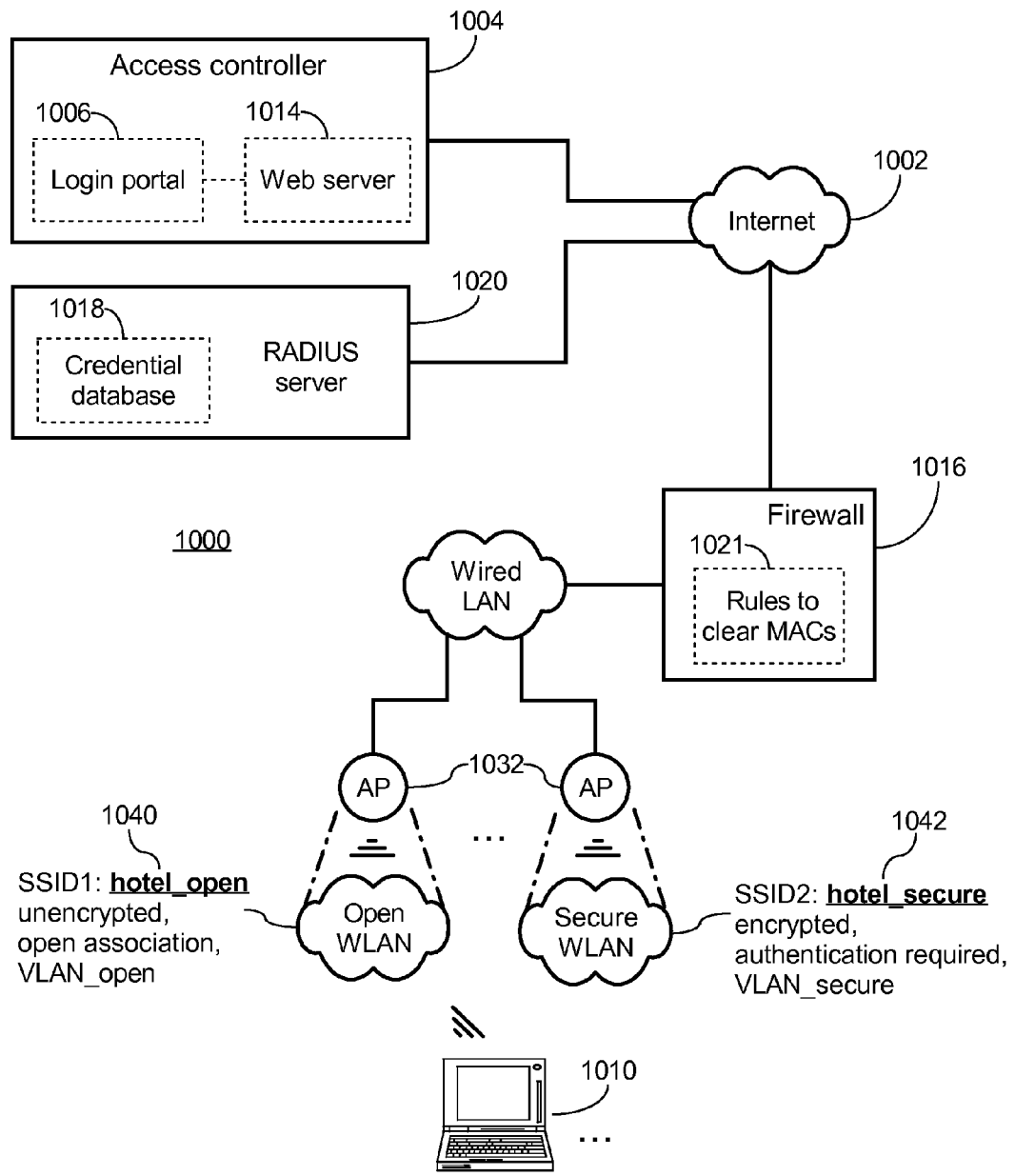
FIG. 10 illustrates a system for providing secure Internet access at a wireless hotspot according to another exemplary embodiment of the present invention.

FIG. 10 illustrates a system 1000 for providing secure access to a resource such as the Internet 1002 at a wireless hotspot according to another exemplary embodiment of the present invention. In this embodiment, the access controller 1004 and RADIUS server 1020 are located external to the hotspot and connected to the hotspot via the Internet 1002. The access controller 1004 includes a webserver 1014 providing a central login portal 1006, and the RADIUS server 1020 stores a credential database 1018 for storing one or more valid access credentials. The hotspot itself includes a firewall 1016 having firewall rules 1021, and one or more APs 1032 for providing the hotspot's open wireless network 1040 and secure wireless network 1042.

The operation of system 1000 can be very similar to the above-provided examples; for instance, the blocks having similar names may operate similar to as previously described and a repeated description is therefore omitted herein. However, because the access controller 1004 and RADIUS server 1020 are external to the hotspot, the firewall rules 1021 in this embodiment also allow the locally located client device(s) 1010 to establish outgoing encrypted connections (e.g., HTTPS) with the external login portal 1006, and allow the APs 1032 to establish outgoing connections to the external RADIUS server 1020 (to verify received access credentials from the client devices 1010 when they request association with the hotspot's secure wireless network 1042). The RADIUS server 1020 and access controller 1004 may also be combined as a single server in another variation of this embodiment.

This embodiment is advantageous in situations where a plurality of different hotspots share a central login portal 1006 and a central RADIUS server 1020. Equipment at the various hotspots is thereby minimized by utilizing a common access controller 1004 and RADIUS server 1020 shared across all the hotspots.

Figure 11:
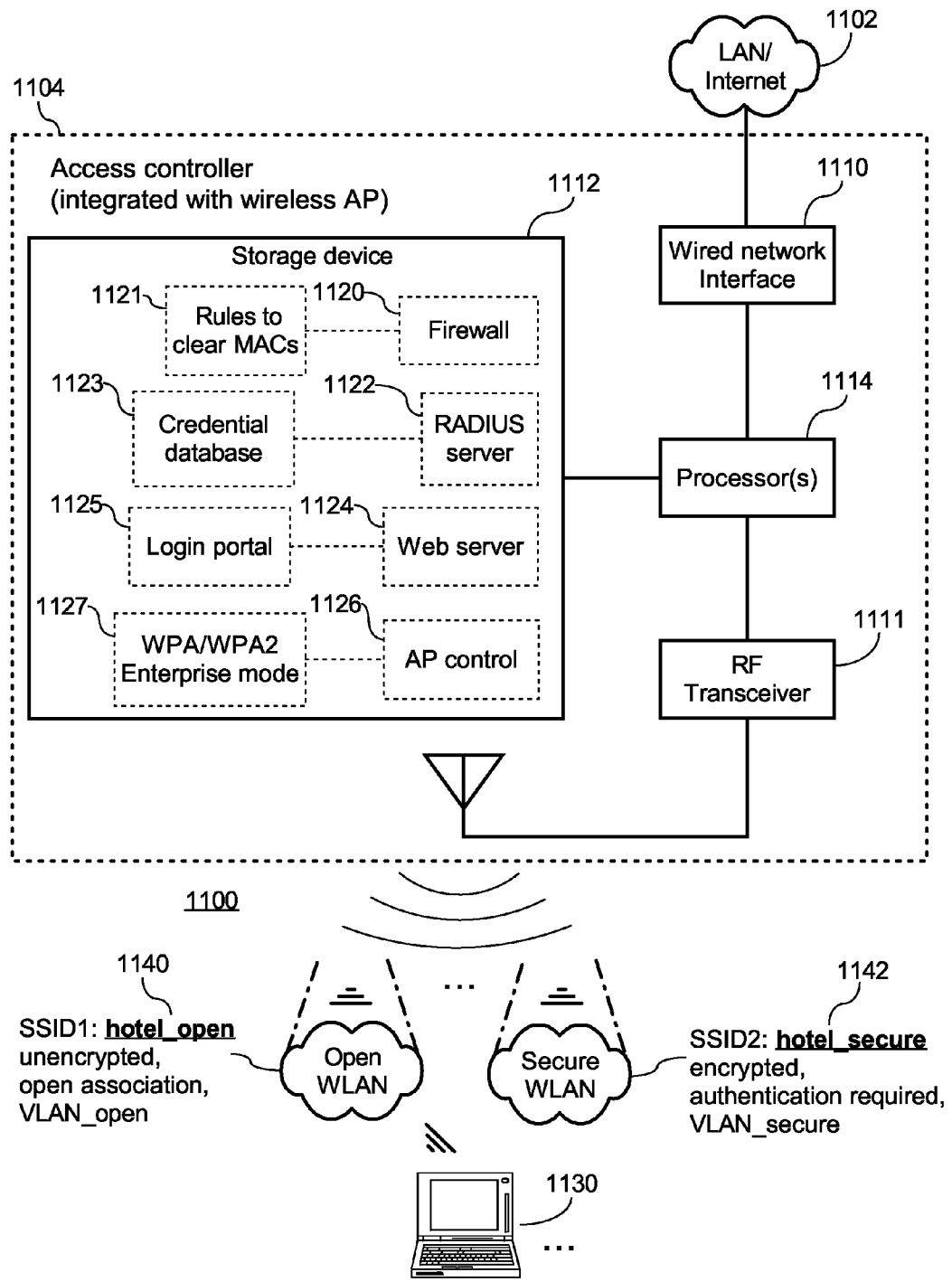
FIG. 11 illustrates a system for providing secure Internet access at a wireless hotspot according to yet another exemplary embodiment of the present invention.

FIG. 11 illustrates a system 1100 for providing secure access to a resource such as the Internet 1102 at a wireless hotspot according to yet another exemplary embodiment of the present invention. In this embodiment, the access controller 1104 is similar to that described in FIG. 1 and is further integrated with a wireless access point (AP). A wired network interface 1110 couples the access controller 1104 to an external network 1102 such as the Internet or a LAN of the hotspot. A radio frequency (RF) transceiver 1111 allows the access controller 1104 to transmit and receive wireless data with client devices 1130, for example in compliance with IEEE 802.11n-2009 incorporated herein by reference.

One or more processors 1114 are coupled to the wired network interface 1110, the RF transceiver 1111, and a storage device 1112. The storage device stores a firewall module 1120, rules to clear MACs 1121, a RADIUS server module 1122, a credential database 1123, a web server module 1124, a login portal 1125, an AP control module 1126, and a WPA/WPA2 Enterprise mode module 1127. Again, although the various modules shown within storage device 1112 are software and data for execution and use by the processors 1114 in this embodiment, in other embodiments they may be implemented as dedicated hardware modules and/or other known circuit techniques.

The operation of system 1100 can also be very similar to the above-provided examples; for example, the blocks having similar names may operate similar to as previously described and a repeated description is therefore omitted herein. Additionally, in this embodiment, the AP control module 1126 sets up the hotspot's open wireless network 1140 and secure wireless network 1142. When a client device 1130 requests association with the secure wireless network 1142, the WPA/WPA2 Enterprise mode module 1127 allows the access controller 1112 to perform the required encryption and authentication procedures to validate a received access credential from the client device 1130. For example, see the previous description of steps 600-606 in FIG. 6.

This embodiment is particularly advantageous at smaller hotspots because the hotspot provider may simply install the access controller 1104 coupled to the Internet 1102 and all required functionality required to provide a wireless hotspot is performed by the access controller 1104. For example, a coffee shop may provide customers with secure Internet access by installing the access controller 1104 within range of its seating area. In a simplified application, the login portal 1125 provides each user with a user-specific access credential, and all users associated with the secure wireless network 1142 may be granted access to the Internet 1102 (see the firewall rules in FIG. 8, for example).

In a more sophisticated embodiment at the above coffee shop example, the login portal 1125 may be a drink ordering system at the coffee shop. A customer with a personal wireless device at the coffee shop does not need to stand in an ordering line. Instead, upon arrival the customer can find an empty table and use their client device 1130 to establish an HTTPS connection with the login portal 1125 over the open wireless network 1140. After a successful drink order, the login portal 1125 provides the user with a user-specific access credential over the HTTPS connection and the user can thereafter associate with the secure wireless network 1140 to browse the Internet while waiting for their drink to be delivered to their specific table. The Internet access may last for 1 hour with each subsequent drink purchase extending the expiry of the user-specific access credential by another hour.

The invention may also be employed to provide secured wireless access to other types of resources in addition to or instead of the Internet. For example, the above-described exemplary hotspot systems 100, 1000, 1100 may be employed at a bus station and provide the user-specific access credential 302 via an encrypted connection over the station's open wireless network 140 so that a member of the public may utilize their personal electronic device 130 such as a mobile phone to securely access a bus ticket purchase system over the secured wireless network 142. Other electronic resources may also be provided over the secure wireless network 142 in a similar manner. An advantage of the invention in some embodiments is that the resource provided at the hotspot does not need to itself provide or support encryption or secure access; instead, all data is encrypted over-the-air at the hotspot due to the nature of the secure wireless network 142 providing network-level encryption.

In the above examples, the APs 132 are configured to only allow client devices 130 to associate with the secure wireless network when the received access credential from the client device during the authentication process corresponds to one of the valid access credentials stored in the credential database 123, for example, by matching the received username/password with those in the database 123 stored in plain text.

In other embodiments, rather than populating the credential database 123 with user's passwords or other access credentials in clear text at step 212 of FIG. 2, the passwords may be converted to another format such as hashed, preferably with a pseudo-random salt value, to thereby increase security in the event of a breach of the access controller 104 and/or the credential database 123.

Thereafter, rather than matching the received access credential with those in the credential database 123 in plain text at step 604/606 of FIG. 6, the RADIUS server 122 and/or APs 132 may hash the received access credential from the client device 130 and look for a match between the resulting hash and a hashed value of the valid access credential stored in the credential database 123. In this way, the received access credential must correspond to a valid access credential in the database 123 in that the hashed value of the received access credential must match the hashed value of one of the valid access credential stored in the credential database 123. Techniques for hashing passwords with random salt are well-known in the art and further description is therefore omitted.

In an exemplary embodiment, a hotspot provides an open wireless network and a secure wireless network. The open wireless network has no network-level encryption and allows open association therewith. The secure wireless network employs network-level encryption and requires authentication of a received access credential from a client device before allowing association therewith. A system for authorizing the client device for secured access at the hotspot includes an access controller configured to establish an encrypted connection between the client device and a login portal of the hotspot over the open wireless network, and to store a user-specific access credential transmitted via the encrypted connection as a valid access credential in a credential database. The credential database is accessed by wireless access points of the hotspot to authenticate the received access credential from the client device in response to a request from the client device to associate with the secure wireless network.

Although the invention has been described in connection with preferred embodiments, it should be understood that various modifications, additions and alterations may be made to the invention by one skilled in the art without departing from the spirit and scope of the invention as defined in the appended claims. For example, although the above-description has focused on a wireless hotspot system at a hotel for illustration purposes, the present invention is equally applicable to any hospitality related location or service wishing to provide a wireless hotspot including but not limited to hotels, motels, resorts, hospitals, apartment/townhouse complexes, restaurants, retirement centers, cruise ships, busses, airlines, airports, shopping centers, passenger trains, libraries, coffee shops, hotspots, etc. Additionally, in addition to the above described hospitality examples, the invention is applicable outside the hospitality industry such as when a home or corporate user desires to setup a wireless hotspot.

In an advantageous embodiment, hotspot providers are enabled to provide only valid wireless users with secure access to a resource at the hotspot without requiring any manual steps by hotspot staff such as physically handing out wireless passwords to customers. Additionally, hackers are prevented from skipping any required login processes at the hotspot and cannot steal access to the resource or cause other problems by impersonating a valid user's MAC/IP address.

The modules may be implemented by software executed by one or more processors operating pursuant to instructions stored on a tangible computer-readable medium such as a storage device to perform the above-described functions of any or all aspects of the access controller. Examples of the tangible computer-readable medium include optical media (e.g., CD-ROM, DVD dics), magnetic media (e.g., hard drives, diskettes), and other electronically readable media such as flash storage devices and memory devices (e.g., RAM, ROM). The computer-readable medium may be local to the computer executing the instructions, or may be remote to this computer such as when coupled to the computer via a computer network such as the Internet. The processors may be included in a general-purpose or specific-purpose computer that becomes the access controller or any of the above-described modules as a result of executing the instructions.

In other embodiments, rather than being software modules executed by one or more processors, the modules may be implemented as hardware modules configured to perform the above-described functions. Examples of hardware modules include combinations of logic gates, integrated circuits, field programmable gate arrays, and application specific integrated circuits, and other analog and digital circuit designs.

Functions of single modules may be separated into multiple units, or the functions of multiple modules may be combined into a single unit. For example, one or more of the firewall 120, RADIUS server 122, and/or web server 124 may be implemented internal or external to the access controller 104. Other types of databases instead of or in addition to a RADIUS server may be utilized to store the credential database.

Unless otherwise specified, features described may be implemented in hardware or software according to different design requirements. In addition to a dedicated physical computing device, the word "server" may also mean a service daemon on a single computer, virtual computer, or shared physical computer or computers, for example. All combinations and permutations of the above described features and embodiments may be utilized in conjunction with the invention.

What is claimed is:

1. A method of authorizing secured wireless access at a hotspot, the method comprising:
providing an open wireless network having no network-level encryption and allowing open association therewith by a client device;
establishing an encrypted connection between the client device and a login portal of the hotspot over the open wireless network;
requiring a user of the client device to perform a predetermined sign-up process at the login portal before adding a user-specific access credential to a credential database;
adding the user-specific access credential as a valid access credential in the credential database, wherein the credential database stores a plurality of valid access credentials acceptable for gaining secure wireless access at the hotspot, and the user-specific access credential is transmitted between the login portal and the client device via the encrypted connection;
providing a secure wireless network employing network-level encryption and requiring successful completion of an authentication process before allowing association therewith by the client device;
receiving a request from the client device to associate with the secure wireless network after the user-specific access credential has been added to the credential database;
receiving the user-specific access credential from the client device as a part of the authentication process performed before the client device is allowed to associate with the secure wireless network;
accessing the credential database to check whether the user-specific access credential received from the client device during the authentication process corresponds to one of the valid access credentials stored in the credential database;
allowing the client device to associate with the secure wireless network only when the user-specific access credential received from the client device during the authentication process corresponds to one of the valid access credentials stored in the credential database;
allowing the client device to access the Internet over the secure wireless network after the client device has successfully associated with the secure wireless network until an Internet access expiry time is reached;
in response to the Internet access expiry time being reached, preventing the client device from accessing the Internet over the secure wireless network and starting a re-login time duration; and
automatically removing the user-specific access credential from the credential database in response to the re-login time duration expiring;
wherein, during the re-login time duration, the user of the client device may sign up for additional Internet access time at the login portal without needing to disconnect from the secure wireless network.

2. The method of claim 1, further comprising causing a web browser running on the client device to establish a hypertext transfer protocol secure (HTTPS) connection with the login portal over the open wireless network after the client device has associated with the open wireless network.

3. The method of claim 2, further comprising:
dynamically generating by the login portal at least part of the user-specific access credential; and
transmitting at least the dynamically generated part of the user-specific access credential from the login portal to the client device over the HTTPS connection.

4. The method of claim 2, further comprising receiving, by the login portal, at least part of the user-specific access credential, wherein the at least part of the user-specific access credential is transmitted from the client device to the login portal over the HTTPS connection.

5. The method of claim 1, further comprising transmitting instructions from the login portal to the client device instructing a user of the client device to switch the client device to a service set identifier (SSID) of the secure wireless network at the hotspot and to authenticate with the secure wireless network utilizing the user-specific access credential.

6. The method of claim 1, wherein the user-specific access credential comprises a username and a password.

7. The method of claim 1, further comprising preventing the client device from accessing the Internet over the open wireless network.

8. The method of claim 1, further comprising disconnecting the client device from the secure wireless network in response to the re-login time period expiring.

9. A system for authorizing secured wireless access at a hotspot, the system comprising:
one or more access points providing an open wireless network having no network-level encryption and allowing open association therewith by a client device;
a computer server having one or more processors executing software in order to provide a login portal;
a storage device coupled to the computer server and storing a credential database, the credential database storing a plurality of valid access credentials acceptable for gaining secure wireless access at the hotspot;
one or more access points providing a secure wireless network employing network-level encryption and requiring successful completion of an authentication process before allowing association therewith by the client device; and
a firewall coupled to the one or more access points providing the secure wireless network and the computer server providing the login portal;
wherein the login portal is operable to establish an encrypted connection with the client device over the open wireless network and requires a user of the client device to perform a predetermined sign-up process before adding a user-specific access credential to the credential database; the login portal is operable to add the user-specific access credential as a valid access credential in the credential database; and the user-specific access credential is transmitted between the login portal and the client device via the encrypted connection; and
wherein: the one or more access points providing the secure wireless network are operable to:
receive a request from the client device to associate with the secure wireless network after the user-specific access credential has been added to the credential database;
receive the user-specific access credential from the client device as a part of the authentication process performed before the client device is allowed to associate with the secure wireless network;
access the credential database to check whether the user-specific access credential received from the client device during the authentication process corresponds to one of the valid access credentials stored in the credential database; and
allow the client device to associate with the secure wireless network only when the user-specific access credential received from the client device during the authentication process corresponds to one of the valid access credentials stored in the credential database;
the login portal is further operable to automatically reconfigure the firewall in order to allow the client device to access the Internet over the secure wireless network until an Internet access expiry time is reached;
the login portal is further operable to automatically reconfigure the firewall to prevent the client device from accessing the Internet over the secure wireless network in response to the Internet access expiry time being reached;
the login portal is further operable to start a re-login time duration in response to the Internet access expiry time being reached;
the login portal is further operable to automatically remove the user-specific access credential from the credential database in response to the re-login time duration expiring; and
during the re-login time duration, the user of the client device may sign up for additional Internet access time at the login portal without needing to disconnect from the secure wireless network.

10. The system of claim 9, wherein:
the firewall is further coupled to the one or more access points providing the open wireless network;
the computer server is a web server providing a web-based login portal; and
after the client device has associated with the open wireless network, the firewall causes a web browser running on the client device to establish a hypertext transfer protocol secure (HTTPS) connection over the open wireless network with the login portal.

11. The system of claim 10, wherein the login portal is further operable to:
dynamically generate at least part of the user-specific access credential; and
transmit at least the dynamically generated part of the user-specific access credential to the client device over the HTTPS connection.

12. The system of claim 10, wherein the login portal is further operable to receive at least part of the user-specific access credential, the at least part of the user-specific access credential being transmitted from the client device to the login portal over the HTTPS connection.

13. The system of claim 9, wherein the login portal is further operable to transmit instructions to the client device instructing a user of the client device to switch the client device to a service set identifier (SSID) of the secure wireless network at the hotspot and to authenticate with the secure wireless network utilizing the user-specific access credential.

14. The system of claim 9, wherein the user-specific access credential comprises a username and a password.

15. The system of claim 9, wherein:
the firewall is further coupled to the one or more access points providing the open wireless network; and
the firewall prevents the client device from accessing the Internet over the open wireless network.

16. The system of claim 9, wherein the login portal is further operable to send a command to the one or more access points providing the secure wireless network in response to the re-login time duration expiring, the command causing the client device to be disconnected from the secure wireless network.

* * * * *